Patented Oct. 9, 1951

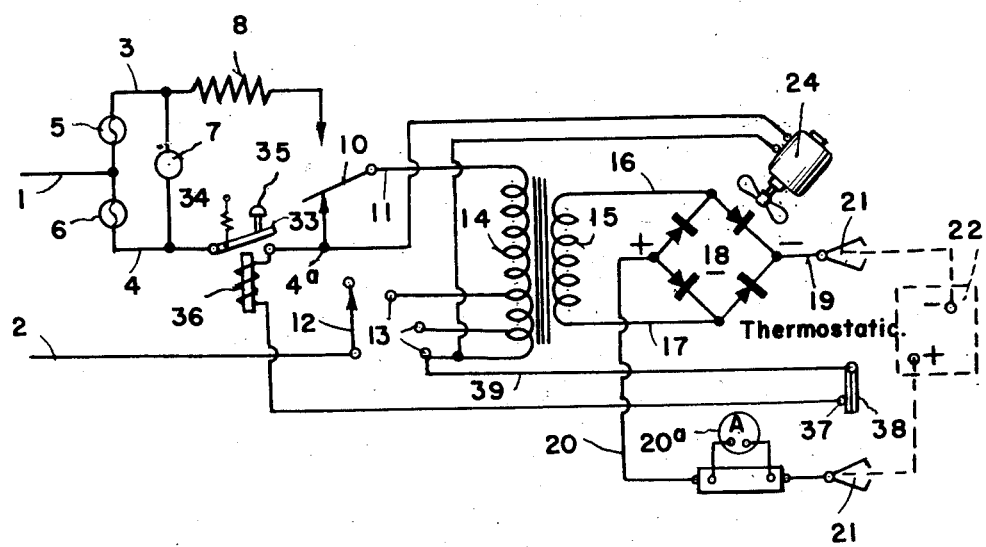
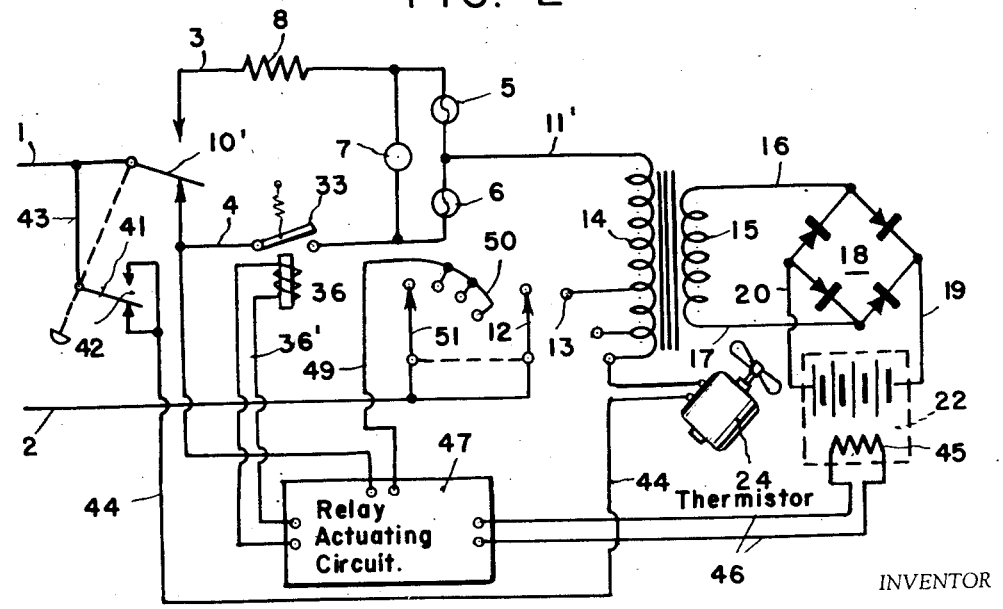

2,571,048

UNITED STATES PATENT OFFICE 2,571,048

SIGNAL MEANS FOR BATTERY CHARGERS

Lewis A. Medlar, Oreland, Pa., assignor, by mesne assignments, to Sterlingworth Company, Philadelphia, Pa., a corporation of Delaware Original application November 3, 1949, Serial No. 125,324. Divided and this application September 11, 1950, Serial No. 184,249

4 Claims. (Cl. 177—311)

This invention relates to charging apparatus for storage batteries, and more particularly to an arrangement for fast charging or slow charging such batteries as desired.

The present application is a division of my prior copending application S. N. 125,324 filed November 3, 1949.

Both the said parent application and the present divisional application relate to arrangements which are generally similar to that covered by my prior Patent Number 2,456,978 issued December 21, 1948, but incorporate novel and important features not embodied in said patent.

Like said patent, the present invention comprises an input circuit having relatively low resistance and high resistance branches connecting the power leads to the transformer primary for fast and slow charging, respectively, together with manual means for selecting the particular branch which it is desired to use.

While, in said patent, the manual selector switch was connected with the primary of the transformer, I now find it desirable under some conditions, to connect such selector switch directly to one of the power leads, and the present invention contemplates connecting it in either way.

A practical difficulty which has been encountered in connection with the operation of battery chargers of this general type is that the operator will frequently, through carelessness or inattention, connect the battery to the charger in reverse, or the connections to the battery may contain a short circuit. In either case a heavy current is drawn from the line, even with the slow charge connection, and the resistor in this connection is damaged or burned out. To protect the charger from this danger, I employ a pair of automatic circuit breakers, one in each branch of the input circuit, and to indicate to the operator when either of these breakers opens, I provide a visual signal such as a lamp. An important object of the present invention is to devise an arrangement by which a single signal lamp is employed and connected with the circuit breakers in such manner that it is actuated by the opening of either breaker. Thus the actuation of this signal lamp serves to indicate to the operator either that the battery has been connected in reverse, or that a short circuit exists.

In order that the invention may be readily understood, reference is had to the accompanying drawing forming part of this specification, and in which—

Fig. 1 is a diagram illustrating my improved battery charging apparatus and showing one arrangement of selector switch, circuit breakers and signal means; and Fig. 2 is a diagram illustrating a somewhat different arrangement of these parts.

Referring to the drawings in detail and more particularly first to Fig. 1, 1 and 2 designate alternating current power leads to which my improved battery charging apparatus is connected. As in my above identified patent, the input circuit consists of two branches 3 and 4 to which the power lead 1 is connected, the branch 3 containing a resistor 8 and being used for slow charging. The branch 4, employed for fast charging, contains, in the present embodiment, a thermally controlled switch 33 hereinafter more particularly described.

Included in each branch 3 and 4 is an automatic circuit breaker, the breaker in branch 3 being designated 5 and the breaker in the branch 4 being designated 6. The terminals at one side of the two circuit breakers are connected together and to the power lead 1, while connected across the other two terminals of the circuit breakers is a signal lamp 7.

At the end of the branches 3 and 4, remote from the power lead 1, is a selector switch 10 adapted to selectively engage either branch, this selector switch being connected by conductor 11 with the primary 14 of the usual transformer, as in said prior patent. In the present case, however, I prefer to place the tap switch 12 and transformer taps 13 at the opposite end of the primary winding 14.

Because of the selector switch 10, it is obvious that only one of the two circuit breakers 5 and 6 can be included in the input circuit at any given time. Thus when the selector switch 10 is in the position shown in Fig. 1 in which it engages the branch 4, the circuit breaker 6 is in circuit while the breaker 5 is idle.

Assuming the switch 33 to be closed, and both breakers in normal position, the signal lamp 7 is short circuited by the breaker 6 and hence receives no current. If, however, the breaker 6 should open then lamp 7 will be energized by current flowing up through breaker 5, and thus caused to glow.

If, on the other hand, selector switch 10 is in engagement with branch 3, for slow charging and if for any reason circuit breaker 5 opens then the lamp 7 will be energized by current flowing down through breaker 6 and out through resistor 8 and switch 10, and thus caused to glow.

Hence it will be seen that the signal lamp 7 is energized or actuated upon the opening of either circuit breaker 5 or 6. The opening of these circuit breakers and the energization of the signal lamp 7 as described serves to indicate to the operator either that the battery is connected in reverse or that there is a short circuit in the battery connections.

The secondary 15 of the transformer is shown as connected by wires 16 and 17 to a rectifier 18 of any suitable type such as an air cooled dry disc rectifier. From this rectifier extend conductors 19 and 20 connected at their ends with battery clamps 21, adapted to be attached to the terminals of the battery 22 to be charged, as in my prior above identified patent. An ammeter 20a is preferably included in the conductor 20.

As in said patent, a fan, driven by a motor 24, is employed to cool the rectifier and this motor is connected across the transformer primary, tapping the branch 4 of the input circuit at the point 4a.

The thermally controlled switch 33 is included in the fast charging branch 4 of the input circuit, and is normally open, being biased to open position by a spring 34. It may be manually closed by means of a push button 35.

This switch is operated by a relay 36 controlled by a thermostatic switch comprising a contact 37 and a bi-metallic element 38. One side of the relay winding 36 is connected with the branch 4 at a point beyond the switch 33 and the other side of this relay winding is connected with contact 37. The bi-metallic element 38 is connected by wire 39 with the transformer primary adjacent the tap switch.

The operation of this modification of the invention is as follows. Normally, when the battery is cold, the thermostatic switch is closed as shown. This does not energize the relay 36, however, because the circuit is broken at the normally open switch 33. Assuming the selector switch 10 to be in the position illustrated in Fig. 1, when the operator desires to commence charging, he depresses the button 35 causing the switch 33 to complete the input circuit. The closing of switch 33 also serves to energize the relay 36 so that this relay holds the switch 33 closed after the push button 35 is released. Charging then proceeds and when the battery attains a predetermined maximum temperature the thermostatic switch 37, 38 opens, thus deenergizing the relay 36 and permitting the spring 34 to open the switch 33, thus interrupting the input or charging circuit.

If the battery is allowed to remain in position, when it cools off the thermostatic switch will close again. But such closing will not serve to energize the relay 36 and again complete the charging circuit. When the relay is deenergized and the switch 33 opens, it therefore remains open until again closed manually. It is not desirable to have the charging current turned on automatically when the battery cools off, and hence the provision of the above described circuit and relay which may be designated a "lock-out" arrangement.

It will be observed that in the arrangement shown in Fig. 1 the fan motor is so connected as to run only when the fast charging branch of the input circuit is employed. When the slow charging branch is used the fan is idle.

In Fig. 2 I have illustrated a modified arrangement in which the selector switch 10' is placed at the power end of the fast and slow charging branches of the input circuit, rather than at the transformer end, as in the previous figure. This selector switch is preferably in the nature of a double pole toggle switch, and in Fig. 2 I have shown a second pole 41 which is mechanically operated in phase with the pole 10'. The pole 41 is connected with the power lead 1 by a conductor 43, and placed between a pair of contacts 42 connected by wire 44 with one side of the fan motor 24, the other side of which is connected to the lower end of the transformer primary. A conductor 11' connects the upper end of the transformer primary with the branches 3 and 4 of the input circuit at a point between the circuit breakers 5 and 6, which, in this modification, are at the transformer end of the branches 3 and 4. The purpose of arranging the pole 41 of the selector switch to swing between the two contacts 42 is to momentarily interrupt the fan circuit as the selector switch 10' is shifted from the fast to the slow charging branch. The fan motor 24 is supplied with current during either fast or slow charging but operates at reduced speed during the latter because of the presence of resistor 8 in the circuit.

Instead of the thermostatic switch shown in Fig. 1, I have illustrated in Fig. 2 the employment of a thermally variable impedance for controlling the energization of relay 36. This thermally variable impedance is shown as a thermistor 45 insertable into the battery casing and connected by wires 46 to a relay actuating circuit of the Wheatstone bridge type. Such a circuit may be of the kind disclosed in co-pending applications Serial No. 87,494, filed April 14, 1949 now Patent No. 2,529,038, in the name of James B. Godshalk and myself, and Serial No. 97,772, filed by me on June 8, 1949, now Patent No. 2,499,663, or of the type shown in Patent No. 1,694,264 to Hull. As is well known, such actuating circuits can be used either to open a normally closed relay switch or to close a normally open one, upon the attainment of a predetermined temperature by the battery. As shown in Fig. 2, the relay switch 33 is normally open, and is closed by the occurrence of a predetermined temperature. The relay winding 36 is connected by wires 36' with the relay actuating circuit, which circuit derives its power through a wire 48 connected with the branch 4 of the input circuit and a wire 49 connected with taps 50 adapted to be engaged by a tap switch 51 mechanically connected with the tap switch 12.

In the arrangement of Fig. 2 it is not necessary to provide a lock-out in connection with the relay itself as in Fig. 1, because the relay actuating circuit 47 incorporates such a lock-out which serves to prevent reenergization of the relay 36 when the battery cools off.

What I claim is:

1. A battery charger comprising a transformer having primary and secondary windings, a pair of power leads, means for connecting said leads to said primary winding so as to provide either a relatively high resistance or a relatively low resistance input circuit, as desired, a rectifier connected with said secondary winding, an automatic circuit breaker in each input circuit, a single signal means, and circuit connections operable upon the opening of either circuit breaker to supply current through the other circuit breaker to said signal means.

2. A battery charger comprising a transformer having primary and secondary windings, a pair of power leads, connections between said leads and said primary winding constituting an input circuit and comprising two alternate branches of relatively high and relatively low resistance, respectively, an automatic circuit breaker in each branch, the junction point of said two alternate branches being connected with one terminal of each of said circuit breakers, and a signal lamp bridged across the remaining terminals of said circuit breakers.

3. A battery charger comprising a transformer having primary and secondary windings, a pair of power leads, one of said leads having two branches, a resistor in one branch, a switch in the other branch, manual means for selectively connecting one end of said primary winding with either of said branches, as desired, the other lead being connected with the other end of said primary winding, an automatic circuit breaker in each of said branches, the junction point of said alternate branches being connected with one terminal of each of said circuit breakers, and a signal lamp bridged across the remaining terminals of said circuit breakers.

4. In a battery charger, an input circuit comprising two alternate branches, manual means for selectively controlling said branches, an automatic circuit breaker in each branch, a normally de-energized signal device, and circuit connections rendered operable by the opening of either circuit breaker for supplying current through the other circuit breaker to energize said signal device.

LEWIS A. MEDLAR.

REFERENCES CITED

The following references are of record in the file of this patent:

UNITED STATES PATENTS

| Number | Name | Date |
| --- | --- | --- |
| 2,366,505 | Fletcher | Jan. 2, 1945 |
| 2,405,929 | Walk | Aug. 13, 1946 |
| 2,464,848 | Collins | Mar. 22, 1949 |